UNITED STATES PATENT OFFICE.

LOIS MARTIN WAER, JOHN H. PHILLIPS, AND WILLIAM S. KENGLA, OF TUCSON, ARIZONA TERRITORY.

TANNING.

SPECIFICATION forming part of Letters Patent No. 375,845, dated January 3, 1888.

Application filed September 3, 1886. Serial No. 212,641. (No specimens.)

*To all whom it may concern:*

Be it known that we, LOIS MARTIN WAER, JOHN HARPER PHILLIPS, and WILLIAM STUMP KENGLA, citizens of the United States, residing at Tucson, in the county of Pima and Territory of Arizona, have invented certain new and useful Improvements in Tanning; and we do declare the following to be a full, clear, and exact description of the invention, such as will enable others skilled in the art to which it appertains to make and use the same.

Heretofore it has been customary to tan hides by subjecting them in the several vats to the action of water and tannic acid contained in oak or other barks, with sometimes an admixture of lime or other substances, and in the usual method of tanning hides it is customary to soften them by first placing them in vats of pure water, where they remain from one to ten days, according as they are green or dry. This we dispense with altogether. Next, in the old method, the hides are placed in handling-vats in which the tan-liquor has to be frequently changed, its strength being gradually increased, and at the end of ten or fifteen days the hides are again moved to the lay-away vats, filled with tan-liquor of increased strength, in which they remain not less than four months, and frequently much longer.

Our process is a very simple one, involving placing the hides but three times in the vats, and not more than three weeks for the complete tanning of the skin, whether green or dry, and no changes of strength in the tan-liquor need be made.

We take the root of the plant known to the Mexicans as "Yerba Colorada" and to the Americans as *Rumex salicifolius*, and chop, grind, or pulverize the same and mix therewith an equal quantity of water, and to twenty-five gallons of this mixture add one pound of pure or concentrated carbolic acid, or one gallon of diluted or dissolved carbolic acid, or one pound of concentrated lye. This mixture of ground root, water, carbolic acid, or lye is placed in a caldron and boiled slowly and thoroughly for twenty-four hours, and then when thoroughly boiled, cooked, and blended (macerated) it is allowed to cool, and when cooled it constitutes the solution we use in tanning hides. One object of the carbolic acid is to prevent fermentation in the composition and to free it from foul and unpleasant odors.

Our process of tanning is as follows: We place in the tan-vat a sufficient quantity of the solid or thick part of the mixture to cover the bottom of the vat and place thereupon a green or dried hide, with the fleshy side undermost, and cover it with the solution in equal parts of the solid and liquid, and on this place a second hide. This process is repeated until the vat is nearly filled, when enough of the mixture or solution is added to cover the top hide and fill the vat. The vat is then allowed to stand with its contents for one week, when the hides are removed and replaced in another vat, and a new supply of the solution or mixture is applied, as before, and the hides allowed to remain for one week more, when they are removed to a third vat and similarly treated, and at the end of the third week they are removed and treated in the usual manner by rubbing, hairing, gum-staving, and currying to convert them into leather.

Our preparation and process is for tanning alone, and we make no claim for dressing the tanned hides.

Having thus described our invention, what we claim therein as new, and desire to secure by Letters Patent, is—

1. The composition for tanning hides, composed of pulverized or ground sour or yellow dock-root, (*Rumex salicifolius*,) water, and carbolic acid, mixed in the proportions substantially as hereinbefore described.

2. The process of tanning hides by subjecting them to a series of baths in a compound composed of pulverized *Rumex salicifolius*, (yellow dock-root,) water, and carbolic acid, in the proportions substantially as hereinbefore described.

In testimony whereof we affix our signatures in the presence of two witnesses.

L. MARTIN WAER.
JOHN H. PHILLIPS.
WILLIAM S. KENGLA.

Witnesses:
SAMUEL J. PRICE,
ARTHUR R. KOESTER.